United States Patent
Von Der Weiden

(10) Patent No.: US 11,541,398 B2
(45) Date of Patent: Jan. 3, 2023

(54) MINCING DRUM FOR A CUTTING AND SEPARATING DEVICE

(71) Applicant: SEPAgrind GmbH, Overath (DE)

(72) Inventor: Helmut Von Der Weiden, Feilbingert (DE)

(73) Assignee: SEPAGRIND GMBH, Overath (DE)

(*) Notice: Subject to any disclaimer, the term of this patent is extended or adjusted under 35 U.S.C. 154(b) by 0 days.

(21) Appl. No.: 17/641,509

(22) PCT Filed: Sep. 9, 2020

(86) PCT No.: PCT/IB2020/058365
§ 371 (c)(1),
(2) Date: Mar. 9, 2022

(87) PCT Pub. No.: WO2021/053464
PCT Pub. Date: Mar. 25, 2021

(65) Prior Publication Data
US 2022/0266257 A1    Aug. 25, 2022

(30) Foreign Application Priority Data
Sep. 18, 2019 (DE) .................... 10 2019 006 557.3

(51) Int. Cl.
*B02C 18/30*  (2006.01)
*A22C 17/00*  (2006.01)

(52) U.S. Cl.
CPC .......... *B02C 18/30* (2013.01); *A22C 17/0026* (2013.01); *B02C 2018/308* (2013.01)

(58) Field of Classification Search
CPC .... B02C 18/30; B02C 18/308; A22C 17/0026
See application file for complete search history.

(56) References Cited

U.S. PATENT DOCUMENTS 369,745 A * 9/1887 Shepard ................ B02C 18/301
                                                          241/82.3
842,236 A * 1/1907 Neukirchen .......... B02C 18/301
                                                          241/82.3
1,604,662 A * 10/1926 Royle ................. B29C 48/6945
                                                          241/82.3
(Continued)

FOREIGN PATENT DOCUMENTS

CN         105454393 A      4/2016
DE     102017003406 A1     10/2018

*Primary Examiner* — Faye Francis
(74) *Attorney, Agent, or Firm* — Hudak, Shunk & Farine Co. LPA

(57) ABSTRACT

A mincing drum for a cutting and separating device, at the first end section of which there is an inlet opening and at the second end section of which there is an outlet opening, a plurality of cutting openings being arranged in a pressure housing section of the mincing drum and passing continuously through the pressure housing section from an inner wall to an outer wall, each cutting opening having, on the inner wall, a cutting opening edge facing the outlet opening and a drawing-in opening edge facing the inlet opening. The cutting performance of the cutting and separating device and the quality of the desired food component is significantly improved as a feed channel which is recessed relative to the inner wall is situated between the cutting opening edge and the drawing-in opening edge.

20 Claims, 2 Drawing Sheets

(56) References Cited

U.S. PATENT DOCUMENTS

| | | | | |
|---|---|---|---|---|
| 1,608,460 | A | * | 11/1926 | Blankinship, Sr. ... B02C 18/301 210/174 |
| 1,611,777 | A | * | 12/1926 | Pincus .................... A47J 19/00 100/145 |
| 1,684,203 | A | * | 9/1928 | Royle ................ B29C 48/6945 241/82.3 |
| 1,724,967 | A | * | 8/1929 | Royle ................ B29C 48/6945 241/32 |
| 3,266,542 | A | * | 8/1966 | Paoli ...................... A22C 25/14 452/172 |
| 3,659,638 | A | * | 5/1972 | Paoli ...................... A22C 17/04 241/74 |
| 4,221,340 | A | * | 9/1980 | dos Santos ............... B02C 9/00 241/8 |
| 4,513,477 | A | * | 4/1985 | Ketels ................. B01D 29/036 241/74 |
| 5,580,305 | A | * | 12/1996 | McFarland ........... B02C 18/301 241/74 |
| 5,597,352 | A | | 1/1997 | Roth |
| 5,813,909 | A | * | 9/1998 | Goldston ............... A22C 17/04 452/138 |
| 6,622,950 | B1 | * | 9/2003 | Fleming ................ A22C 17/04 241/74 |
| 7,896,730 | B2 | * | 3/2011 | Lesar .................. A22C 17/004 452/138 |
| 9,107,426 | B2 | * | 8/2015 | Eisiminger ........ A22C 21/0069 |
| 2019/0283036 | A1 | * | 9/2019 | Rochedreux ........... A22C 17/04 |
| 2020/0298245 | A1 | * | 9/2020 | Seydelmann ......... B02C 18/362 |

* cited by examiner

Detail

MINCING DRUM FOR A CUTTING AND SEPARATING DEVICE

FIELD OF THE INVENTION

The invention relates to a mincing drum for a cutting and separating device, at the first end section of which there is an inlet opening and at the second end section of which there is an outlet opening, a plurality of cutting openings being arranged in a pressure housing section of the mincing drum and passing continuously through the pressure housing section from an inner wall to an outer wall, each cutting opening having, on the inner wall, a cutting opening edge facing the outlet opening and a drawing-in opening edge facing the inlet opening. The invention is also implemented in a cutting and separating device.

BACKGROUND OF THE INVENTION

The mincing drum used in cutting and separating devices are often used in the food industry, in particular for the shredding and further processing of meat. In the food industry, lean meat muscle groups with a low proportion of collagenous tissue are of particular interest when processing meat, for example into sausage products. However, the meat to be processed is usually also interspersed with fatty tissue, collagenous tissue and tendons, which should be sorted out as completely as possible during the comminution and removed from the processing cycle.

Cutting and separating devices according to DE 10 2017 003 406 A1, for example, are used to remove these unwanted components and have a mincing drum with a conveying screw rotatably mounted therein. The mincing drum has a multiplicity of radially aligned cutting openings. Food to be processed is fed into the mincing drum via an inlet opening, in which softer parts of the food to be processed escape into the cutting openings due to the pressure transmitted to the food by the conveying screw, are off as food studs and are pressed out of the mincing drum through the cutting openings.

This is the food ingredient desired for further processing. Stringy material and unusable solids do not take part in the shredding process and leave the mincing drum through an outlet opening at the end. However, it has been shown that a large proportion of the food to be processed is not comminuted by a separating cut but by squeezing, as a result of which the cutting performance of the cutting and separating device and the quality of the desired food component are not sufficient.

SUMMARY OF THE INVENTION

The underlying object of the invention was therefore to improve a mincing drum such that the cutting performance of the cutting and separating device and the quality of the desired food component is significantly improved.

The object is achieved according to the invention with a mincing drum, at the first end section of which there is an inlet opening and at the second end section of which there is an outlet opening, a plurality of cutting openings being arranged in a pressure housing section of the mincing drum and passing continuously through the pressure housing section from an inner wall to an outer wall, each cutting opening having, on the inner wall, a cutting opening edge facing the outlet opening and a drawing-in opening edge facing the inlet opening, wherein a feed channel which is recessed relative to the inner wall is situated between the cutting opening edge and the drawing-in opening edge. The cutting openings emerge on the inner wall of the mincing drum and, when the cutting and separating device is in operation, perform the majority of the cutting work on the foodstuff to be processed.

The feed channel arranged between the cutting opening edge and the drawing-in opening edge of the opening is arranged below a level of the inner wall of the mincing drum. The feed channel is always open to the inside of the pressure housing section. The feed channel is preferably formed as a recess which is concave with respect to the inner wall and which in particular has a rounded or angular cross-sectional contour. During the operation of the cutting and separating device, foodstuffs to be comminuted first enter the feed channel via the opening edge that is drawn in in the conveying direction. As a result, the food to be chopped is at a level below the cutting opening edge, so that only when the cutting opening is completely filled and a food stud is formed in it excessive food is conveyed over the cutting opening edge, separated from the meat stud and fed to one of the subsequent cutting openings.

For a high-quality cut of the desired food and a high cutting performance, it is essential that the food to be chopped is supported on the inner wall against a rotational movement transmitted by the conveying screw and that the rotational movement is converted into a forward movement that is as straight as possible in the direction of the outlet opening. The lowered feed channels provide a continued mechanical support and forward motion of the food to be minced, resulting in higher pressure within the food to be minced and the formation of longer meat plugs within the cutting openings.

Advantageously, the feed channel is aligned axially parallel to a longitudinal axis of the pressure housing section. This results in a particularly favorable filling of the cutting openings, since the food to be chopped up performs a feed movement that is as axial as possible in the direction of the outlet opening, which results in a particularly high pressure within the food to be chopped up. In addition, the feed channel and thus also the food to be chopped up in it meet the cutting opening edge centrally, so that maximum filling of the cutting opening is supported and before the cutting opening is completely filled with the formation of a corresponding food stud, food that is hardly to be chopped disappears laterally of the respective cutting opening.

The feed channel can have an axial length that corresponds to 5% to 20% of the diameter of the cutting openings formed on the inner wall. Such a ratio between the diameter of the cutting openings and the axial length of the feed channel is appropriate for sufficient support of the foodstuff to be comminuted preventing it from rotating with the conveying screw.

On the other hand, the proposed axial length of the feed channel still allows a sufficiently narrow spacing of the cutting openings in the axial direction and thus a sufficient number of cutting openings in the pressure housing section of the mincing drum. The number of cutting openings is also decisive for the cutting performance of the cutting and separating device.

It has proven to be particularly favorable if the feed channel has a depth of between 0.5 mm and 4.0 mm in relation to the inner wall. Such a depth provides sufficient support for the food to be minced. A smaller depth of the feed channel cannot provide sufficient support for the food to be comminuted, whereas an even deeper feed channel, depending on the nature of the food to be comminuted, does not receive sufficient filling. In addition, even deeper feed channels are more difficult to clean.

The feed channel should have a maximum width in the circumferential direction, which corresponds to a diameter of the cutting openings formed on the inner wall. This also maximizes the degree to which the respective cutting opening is filled with the food to be chopped up.

It makes sense for the feed channel to widen conically from the drawing-in opening edge towards the cutting opening edge. This is achieved, for example, by an elliptically shaped drawing-in opening edge having a maximum diameter aligned with the longitudinal axis of the drum. This shape can be achieved, for example, by widening the cutting opening on one side in the direction of the entry opening, for example by means of an inclined milling head.

Appropriately, starting from a level of the inner wall, the feed channel descends obliquely in the direction of a hole axis of the associated cutting opening by means of an inlet incline. This results in the advantage that the food to be chopped slides as completely as possible from the inner wall into the feed channel and is fed from there to the cutting opening.

Preferably, the cutting openings are aligned with axes inclined at an angle with respect to the inner wall. The inclined axes of the cutting openings result in a particularly sharp, cutting opening edge with a wedge angle of less than 90° in the transition area between cutting opening and inner wall. On the opposite side of the cutting opening edge, however, the cutting opening has a drawing-in opening edge and the adjoining feed channel into which the food to be processed migrates, thereby reaching below a level of the cutting opening edge and, as long as the cutting opening is not filled with a food stud, due to the cutting edge of the opening projecting in the axial direction, cannot migrate across it. Due to the combination of deepened feed channel and inclined axis of the cutting openings, the respective cutting opening is almost completely filled. Only excessive food to be processed that no longer fits into the already filled cutting opening migrates over the cutting edge of the opening and is conveyed further inside the mincing drum to one of the other cutting openings.

Advantageously, the angle of the inclined axis is arranged on the side of the cutting opening facing away from the inlet opening of the mincing drum, between the hole axis and the inner wall. At this angle, the axis of the cutting opening is inclined in the direction of the inlet opening of the mincing drum. In the axial direction of the mincing drum, its radius expediently aligns with the axis of the cutting opening or, in other words, the axis of the hole intersects the longitudinal axis of the mincing drum running through the pressure housing section in the radial direction. Each cutting opening can therefore have, with the inner wall of the pressure housing section, a cutting opening edge facing the outlet opening and a drawing-in opening edge facing the inlet opening.

Since the food to be processed is advanced from the inlet opening essentially axially through the mincing drum in the direction of the outlet opening, the cutting opening edge is formed on the side of the cutting opening facing away from the inlet opening of the mincing drum and thus opposes the main direction of movement of the food to be processed. This results in a particularly clean separating cut without significant crushing of the food to be processed.

The angle of the cutting opening axes is preferably between 60° and 88°, particularly preferably 65° to 85°, very particularly preferably 70 to 80°. The smaller the angle, the sharper the resulting cutting opening edge, which results in a particularly high cutting performance with high quality of the food component desired for further processing. A smaller angle, however, also reduces the wear-related service life of the mincing drum.

The cutting opening axes are sensibly aligned in such a way that the cutting opening edge between the inner wall and the respective axis is formed at the angle. The wedge angle of the cutting opening edge corresponds to the angle of the associated cutting opening axis.

In the axial direction and/or in the circumferential direction, opening edges of adjacent cutting openings can be aligned with one another in an overlapping manner. This avoids the formation of webs and part of the food to be processed being conveyed through the pressure housing section without contact with a cutting opening. Advantageously, cutting openings arranged one behind the other in the axial direction are aligned offset to one another in the circumferential direction with an offset angle of 3° to 9°, particularly preferably 4° to 8°, very particularly preferably 5° to 7°.

The invention is also implemented in a cutting and separating device with the mincing drum according to the invention, comprising a conveying screw being rotatably mounted in the mincing drum, comprising a screw shaft with at least a screw flight spirally formed thereon, which in the installed position, has a front flank for the pushing transport of a foodstuff, a rear flank arranged on the opposite side and at its distal end between the front flank and the rear flank a cylindrical portion which is formed with a sharpened cutting edge in the transition area to the front flank of the screw flight.

The screw shaft and the screw flight are preferably designed as a one-piece integral structural unit in order to be able to permanently transmit the operational forces to be expected. The sharpened cutting edge serves in particular to remove any buildup on the inner wall of the pressure housing section, since otherwise, for example, collagenous meat components will cover the cutting openings and food to be processed will no longer be pressed into the cutting openings as well as into the respective feed channel and chopped up. Due to the sharpened cutting edge, the cutting performance of the cutting and separating device is increased even further.

The sharpened cutting edge is preferably formed on a section of the conveying screw which sweeps over the cutting openings. The food to be processed is only chopped up in this area, with the risk of the cutting openings being covered. A feeding section of the conveying screw, which can be arranged upstream between the pressure housing section with the cutting openings made therein and the inlet opening of the mincing drum, does not require a sharpened cutting edge. As a result, the production costs of the conveying screw can be reduced considerably, since the sharpened cutting edge only has to be shaped in sections on the conveying screw.

The cylindrical portion of the screw flight can have a width which corresponds at least to the diameter of the cutting openings on the inner wall. With this dimensioning and the operational loads to be expected, the screw flight has sufficient strength without reversible deformation. In addition, the cutting performance and quality are favorably influenced, since the piece of meat held in the cutting opening is completely detached from the foodstuff to be processed in the pressure housing section.

It has proven to be particularly favorable if the sharpened cutting edge is designed with a positive rake angle located between the front flank and a processing plane aligned perpendicular to the screw shaft. The positive rake angle catches behind and removes residues from the food to be processed that get into the effective range of the conveying screw.

The rake angle is preferably between 10° and 50° particularly preferably 20° and 40°, very particularly preferably between 25° and 35°.

Advantageously, a wedge angle of 40° to 80°, particularly preferably 50° to 70°, very particularly preferably 55° to 65°, is formed between the front flank and the cylindrical portion.

According to a particularly expedient embodiment, a groove is introduced at a distal end of the front flank, wherein an outer contour of the groove intersects the cylindrical portion. In this embodiment, the outer contour of the groove forms the relevant section of the front flank of the screw flight. In this case, the rake angle is arranged between the outer contour of the groove and the processing plane. The wedge angle then extends between the outer contour of the groove and the cylindrical portion of the screw flight.

A radius or a bevel is expediently arranged between the cylindrical portion and the rear flank. Such a reduction in material reduces the temperature rise in the food to be processed and thereby lowers the bacterial load.

BRIEF DESCRIPTION OF THE DRAWINGS

For better understanding, the invention is explained in more detail below with reference to three Figures showing in FIG. 1 a longitudinal section through the mincing drum according to the invention.

DETAILED DESCRIPTION OF THE INVENTION

Figure 1:
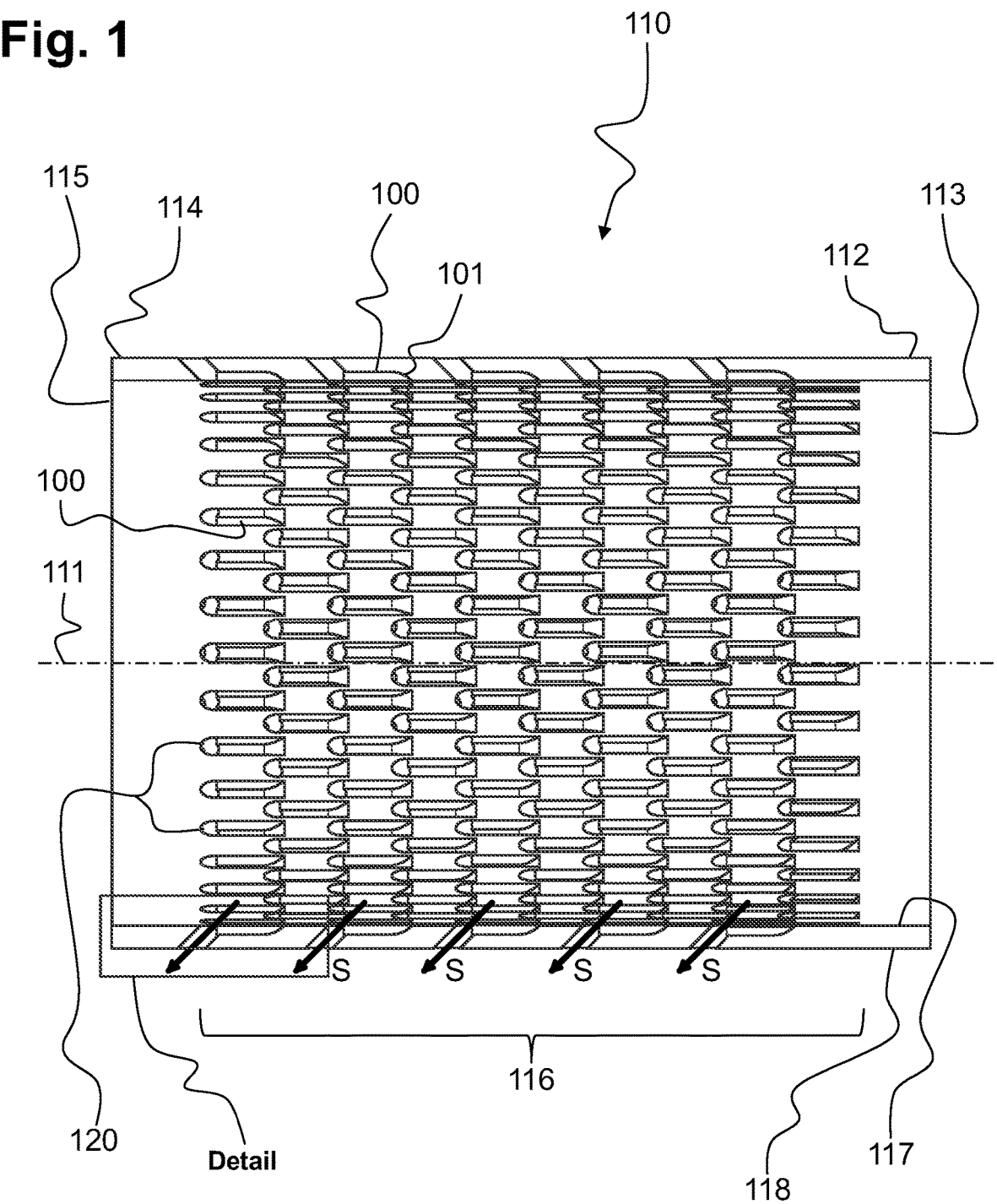

FIG. 1 shows a longitudinal section through a mincing drum 110 having a cylindrical cross section, with an inlet opening 113 being formed on its first end section 112, through which the foodstuff to be comminuted is fed to the mincing drum 110. At the opposite end of the mincing drum 119 there is a second end section 114 on which an outlet opening 115 is formed, through which stringy material and unusable solids are conveyed out of the mincing drum 110. The inlet opening 113 and the outlet opening 115 each form opposite axial openings of the mincing drum 119.

The mincing drum 110 has a pressure housing section 116 with a multiplicity of cutting openings 120 which run continuously from an inner wall 117 of the pressure housing section 116 to an outer wall 118. The food component desired for further processing escapes through the cutting openings 120 and takes the cutting discharge path S indicated as an example by means of arrows.

Figure 2:
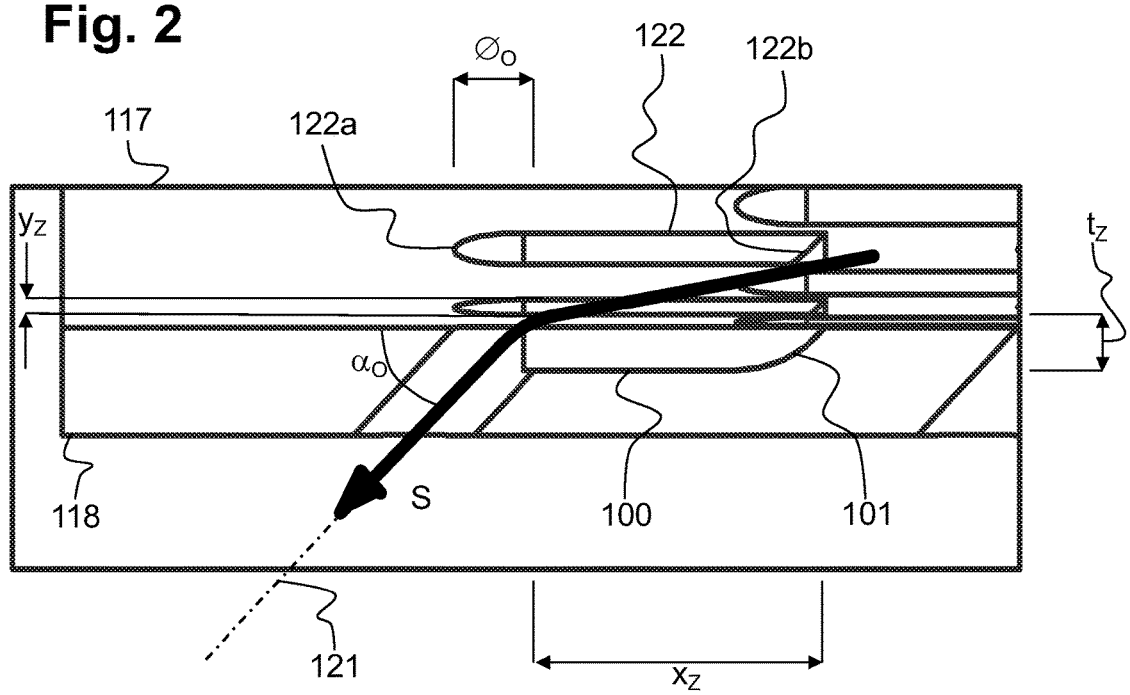
FIG. 2: an enlarged longitudinal section through a detail of FIG. 1.

FIG. 2 shows an enlargement of the detail marked in FIG. 1 relating to the cutting openings 120. The cutting openings 120 do not run in the radial direction through the pressure housing section 116, but are arranged with their hole axis 121 inclined. The inclination of the hole axis 121 is selected in such a way that it faces the inlet opening 113 on the inner wall 117.

However, only the diameter $\emptyset_o$ of the cutting openings 120 arranged in the area of the inner wall 117 is involved in the comminution work of the food to be processed. The hole axis 121 is inclined at an angle $\alpha_o$. The angle $\alpha_o$ is located on the side of the outlet opening 115 between the hole axis 121 and the inner wall 117 or a longitudinal axis 111 of the mincing drum 110.

Each cutting opening 120 has a circumferential opening edge 122 in the transition area to the inner wall 117 of the pressure housing section 116, of which a part facing the outlet opening 115 serves as a cutting opening edge 122a and a part facing the inlet opening 113 as a drawing-in opening edge 122b for the food to be chopped. The inclination of the hole axis 121 at the angle $\alpha_o$ results in a particularly sharp cutting opening edge 122a at the same acute angle $\alpha_o$.

A feed channel 100 extends from the cutting opening 120 in the direction of the inlet opening 113 and promotes the entry of the foodstuff to be comminuted into the respective cutting opening 120.

The feed channel 100 has a maximum depth $t_z$, which is formed at least in the transition area to the respective cutting opening 120. Starting from the cutting opening 120, the entire feed channel 100 or, in accordance with the exemplary embodiment in FIG. 1 and FIG. 2, at least a section of the feed channel 100 facing the drawing-in opening edge 122b, is formed with an inlet incline 101, which supports the entry of the food to be chopped into the feed channel 100.

A width yZ of the feed channel 100 corresponds to the diameter $\emptyset_o$ of the associated cutting opening 120, even if the illustration in FIG. 2 gives a different impression in longitudinal section. The feed channel 100 extends with its axial length $x_z$ from the cutting opening 120 to the drawing-in opening edge 122b, which defines the transition area from the feed channel 100 to the inner wall 117 on the side towards the inlet opening 113.

Figure 3:
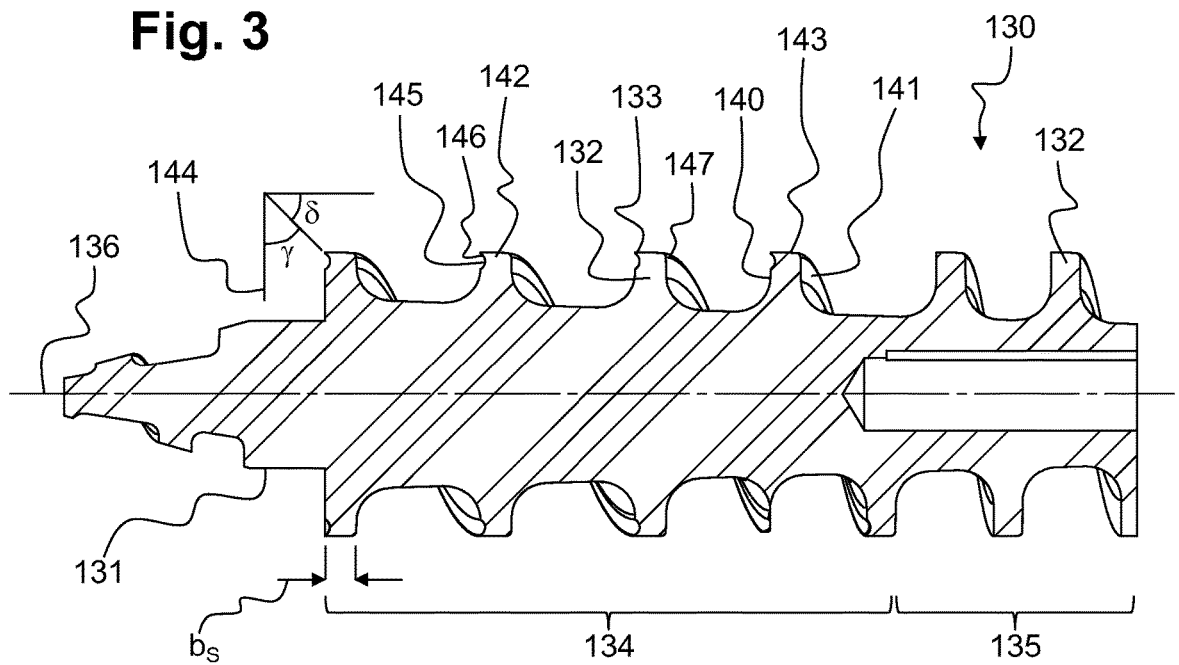
FIG. 3: a longitudinal section through a conveying screw that can be inserted concentrically into the mincing drum.

FIG. 3 shows a conveying screw 130 in a longitudinal section, which is inserted coaxially into the mincing drum 110 when ready for operation. The conveying screw 130 comprises a rotatably driven screw shaft 131 which has a longitudinal axis 136 being aligned with the longitudinal axis 111 of the mincing drum 110. At least one screw flight 132 is formed on the screw shaft 131 and surrounds the screw shaft 131 in a spiral shape in the axial direction. When the screw shaft 131 rotates, due to its pitch, the food in the mincing drum 110 is pushed forward from the inlet opening 113 in the direction of the outlet opening 115.

During this process, a pressure builds up within the food to be processed, which pushes the food to be processed into the feed channel 100 and the cutting openings 120, so that a food stud is formed within each cutting opening 120. Due to the continuous feed movement of the food to be processed applied by the conveying screw 130, the food stud tears off the food remaining in the pressure housing section 116 and penetrates through the cutting opening 120 out of the mincing drum 110 to the outside.

The screw flight 132 has a front flank 140 and a rear flank 141. A cylindrical portion 143 can be seen between the front flank 140 and the rear flank 141 at each distal end 142 of the screw flight 132, which is shaped complementary to the inner wall 117 of the pressure housing section 116.

However, the screw flight 132 is only formed at its outer end with a sharpened cutting edge 133 in the area of the pressure housing section 116, ie in a sweeping section 134 of the conveying screw 130 sweeping over the cutting openings 120.

The sharpened cutting edge 133 comprises a groove 145 placed in the front flank 140, wherein the outer contour 146 of which adjoins on the cylindrical portion 143 and merges into it. The groove 145 is formed equidistant to the cylindrical portion 143 over the axial course of the conveying screw 130 and extends over the entire section 134 sweeping over the cutting openings 120.

With the help of the sharpened cutting edge 133, in particular, adhesions of the food to be processed on the inner wall 117 of the pressure housing section 116 can be peeled off, so that they do not permanently lie over the cutting openings 120 and thereby prevent the food to be processed from entering the cutting openings 120. Such adhesions usually consist of collagenous material, which has up to twenty times the strength of lean meat and hardly penetrates into the cutting openings 120 due to its high strength. Buildup peeled off by the sharpened cutting edge 133 is transported in the direction of the outlet opening 115 and removed there from the shredding drum 110.

The sharpened cutting edge 133 is formed from the outer contour 146 of the groove 145 and the cylindrical portion 143. The sharpened cutting edge 133 has a rake angle γ that is spanned between a processing plane 144 that is perpendicular to the axial extension of the conveying screw 130 and the outer contour 146 of the groove 145. A wedge angle δ is arranged between the outer contour 146 of the groove 145 and the cylindrical portion 143 of the screw flight 132. Since the clearance angle is always 0° due to the cylindrical portion 143 of the screw flight 132, the sum of the rake angle γ and the wedge angle δ is always 90°.

The sharpened cutting edge 133 is only present in the sweeping section 134 traversing the cutting openings 120. In a feeding section 135 of the conveying screw 130, which protrudes beyond the mincing drum 110 between the pressure housing section 116 with the cutting openings 120 and the inlet opening 113, the conveying screw 130 only has a conventional screw flight 132, which has a cutting edge being designed for example with a rake angle γ of 90°. Since there are no cutting openings 120 in the mincing drum 110 in this area, they are also not clogged by adhesions of the food to be processed and consequently do not have to be removed from the sharpened cutting edge 133 of the conveying screw 130.

For a high cutting performance of the cutting and separating device 100, the screw flight 132 in the area of the section 134 sweeping over the cutting openings 120 has a width $b_s$ that corresponds at least to the diameter $Ø_o$ of the cutting openings 120 on the inner wall 117 of the pressure housing section 116. The width $b_s$ forms the perpendicularly distance between the front flank 140 and the rear flank 141 of the screw flight 132.

A bevel 147 is formed in the transition area between the cylindrical portion 143 of the screw flight 132 and the associated rear flank 141, which also contributes to reducing the heating of the food to be processed. Instead of a bevel, a radius or another geometric shape can also be provided in the transition area between the cylindrical portion 143 and the rear flank 141; it is always essential that there is a reduction in the material of the screw flight 132 in this area. The bevel 147 runs in accordance with the groove 145 exclusively in the sweeping section 134 of the conveying screw 130 that sweeps over the cutting openings 120.

LIST OF REFERENCE NUMBERS 100 feed channel
101 inlet incline feed channel
110 mincing drum
111 longitudinal axis of drum
112 first end section mincing drum
113 inlet opening
114 second end section mincing drum
115 outlet opening
116 pressure housing section
117 inner wall pressure housing section
118 outer wall pressure housing section
120 cutting openings
121 axis cutting openings
122 opening edge
122a cutting opening edge
122b drawing-in opening edge
130 conveying screw
131 screw shaft
132 screw flight
133 sharpened cutting edge
134 cutting openings sweeping section
135 feeding section
136 longitudinal axis of conveying screw
140 front flank
141 rear flank
142 distal end
143 cylindrical portion
144 processing plane
145 groove
146 outer contour groove
147 bevel
$b_s$ width of screw flight
S cutting discharge path
$t_z$ depth of feed channel
$x_z$ axial length of feed channel
$y_z$ width of feed channel
$α_o$ angle axis cutting openings
$Ø_o$ diameter cutting openings
γ rake angle cutting edge
δ wedge angle cutting edge

What is claimed is:

1. A mincing drum for a cutting and separating device that can be used to process foodstuffs, comprising:
    an inlet opening at a first end section,
    an outlet opening at a second end section,
    an inner wall,
    an outer wall,
    a pressure housing section located between the first end section and the second end section,
    a plurality of cutting openings being arranged in the pressure housing section of the mincing drum and passing continuously through the pressure housing section from the inner wall to the outer wall, each cutting opening having, on the inner wall, a sharpened cutting opening edge facing the outlet opening and a drawing-in opening edge facing the inlet opening, wherein in the pressure housing section pressure builds up within the foodstuff to be processed, which pushes the foodstuff through a feed channel and the cutting openings, and
    wherein the feed channel, which is recessed relative to the inner wall, is situated between the sharpened cutting opening edge and the drawing-in opening edge.

2. The mincing drum according to claim 1, wherein the feed channel is aligned axially parallel to a longitudinal axis of the pressure housing section.

3. The mincing drum according to claim 1, wherein the feed channel has an axial length ($x_z$) that corresponds to 5% to 20% of a diameter ($Ø_o$) of the cutting openings formed n the inner wall.

4. The mincing drum according to claim 1, wherein the feed channel has a depth ($t_z$) of between 0.5 mm and 4.0 mm in relation to the inner wall.

5. The mincing drum according to claim 1, wherein the feed channel has a maximum width ($y_z$) in the circumferential direction which corresponds to a diameter ($\varnothing_o$) of the cutting openings.

6. The mincing drum according to claim 1, wherein the feed channel is widened conically from the sharpened cutting opening edge in the direction of the drawing-in opening edge.

7. The mincing drum according to claim 1, wherein the feed channel descends obliquely by an inlet incline, starting from a level of the inner wall in the direction of an axis of the associated cutting opening.

8. The mincing drum according to claim 1, wherein the cutting openings are aligned with axes inclined at an angle ($\alpha_o$) relative to the inner wall.

9. The mincing drum according to claim 8, wherein the angle ($\alpha_o$) is between 60° and 88°.

10. The mincing drum according to claim 8, wherein the angle ($\alpha_o$) is arranged on the side of the cutting opening facing away from the inlet opening between its axis and the inner wall.

11. The mincing drum according to claim 8, wherein the cutting opening axis intersects in the radial direction the longitudinal drum axis running through the pressure housing section.

12. The mincing drum according to claim 8, wherein the cutting opening axes are aligned in such a way that the sharpened cutting opening edge is formed with the angle ($\alpha_o$).

13. The mincing drum according to claim 1, wherein opening edges of adjacent cutting openings are aligned to overlap one another in the axial direction and/or in the circumferential direction.

14. A cutting and separating device with the mincing drum according to claim 1, wherein a conveying screw is rotatably mounted in the mincing drum, comprising a screw shaft with at least a screw flight spirally formed thereon, which in the installed position has a front flank for the pushing transport of a foodstuff, a rear flank arranged on the opposite side and at a distal end of the screw flight between the front flank and the rear flank a cylindrical portion which is formed with a sharpened cutting edge in the transition area to the front flank of the screw flight.

15. The cutting and separating device according to claim 14, wherein the sharpened cutting edge is formed on a sweeping section of the conveying screw which sweeps over the cutting openings.

16. The cutting and separating device according to claim 14, wherein the cylindrical portion of the screw flight has a width ($b_s$) which is at least the diameter ($\varnothing_o$) of the cutting openings on the inner wall.

17. The cutting and separating device according to claim 14, wherein the sharpened cutting edge is formed with a positive rake angle ($\gamma$) located between the front flank and a processing plane perpendicular to the screw shaft.

18. The cutting and separating device according to claim 14, wherein a groove is formed at a distal end of the front flank, wherein an outer contour of the groove intersects the cylindrical portion.

19. The cutting and separating device according to claim 14, wherein a radius or a bevel is arranged between the cylindrical portion and the rear flank.

20. The mincing drum according to claim 2, wherein the feed channel has an axial length ($x_z$) that corresponds to 5% to 20% of a diameter ($\varnothing_o$) of the cutting openings formed on the inner wall, wherein the feed channel has a depth ($t_z$) of between 0.5 mm and 4.0 mm in relation to the inner wall, wherein the feed channel has a maximum width ($y_z$) in the circumferential direction which corresponds to a diameter ($\varnothing_o$) of the cutting openings, wherein the feed channel is widened conically from the sharpened cutting opening edge in the direction of the drawing-in opening edge, wherein the feed channel descends obliquely by an inlet incline, starting from a level of the inner wall in the direction of an axis of the associated cutting opening, wherein the cutting openings are aligned with axes inclined at an angle ($\alpha_o$) relative to the inner wall, wherein the angle ($\alpha_o$) is between 60° and 88°, wherein the angle ($\alpha_o$) is arranged on the side of the cutting opening facing away from the inlet opening between its axis and the inner wall, wherein the cutting opening axis intersects in the radial direction the longitudinal drum axis running through the pressure housing section, wherein the cutting opening axes are aligned in such a way that the sharpened cutting opening edge is formed with the angle ($\alpha_o$), and wherein opening edges of adjacent cutting openings are aligned to overlap one another in the axial direction and/or in the circumferential direction.

\* \* \* \* \*